United States Patent [19]

Buter

[11] Patent Number: 5,093,411

[45] Date of Patent: *Mar. 3, 1992

[54] PROCESS FOR THE PREPARATION OF A DISPERSION STABILIZER AND A DISPERSION STABILIZER

[75] Inventor: Roelof Buter, Dieren, Netherlands

[73] Assignee: Akzo N.V., Netherlands

[*] Notice: The portion of the term of this patent subsequent to Aug. 15, 2006 has been disclaimed.

[21] Appl. No.: 389,508

[22] Filed: Aug. 4, 1989

Related U.S. Application Data

[62] Division of Ser. No. 135,254, Dec. 21, 1987, Pat. No. 4,871,797.

[30] Foreign Application Priority Data

Dec. 30, 1986 [NL] Netherlands .......................... 8603324

[51] Int. Cl.$^5$ .................................................. C08K 5/06
[52] U.S. Cl. ..................................... 524/761; 524/700; 524/755
[58] Field of Search ................................ 524/755, 761

[56] References Cited

U.S. PATENT DOCUMENTS

| | | | |
|---|---|---|---|
| 3,054,762 | 9/1962 | Rees | 524/761 X |
| 3,779,960 | 12/1973 | Araki et al. | 524/761 |
| 4,026,962 | 5/1977 | Lambla et al. | 526/201 |
| 4,315,085 | 2/1982 | Ozari et al. | 525/10 |
| 4,340,511 | 7/1982 | Backhouse et al. | 524/40 |
| 4,556,686 | 12/1985 | Horvath | 524/315 |
| 4,622,358 | 11/1986 | Pennewiss et al. | 524/297 |
| 4,639,394 | 1/1987 | Das et al. | 428/327 |
| 4,857,577 | 8/1989 | Buter | 524/458 |

*Primary Examiner*—Joseph L. Schofer
*Assistant Examiner*—J. M. Reddick
*Attorney, Agent, or Firm*—Oliff & Berridge

[57] ABSTRACT

The invention provides a stabilizer for an aqueous dispersion of an acrylic polymer that is obtained by successive copolymerization in random order of a monomer mixture A consisting of particular amounts of styrene or methyl styrene, acrylic acid or methacrylic acid, and optionally another comonomer, and a monomer mixture B consisting of particular amounts of styrene or methyl styrene, a (cyclo)alkyl methacrylate having 1–12 carbon atoms in the (cyclo)alkyl group, and optionally another comonomer, in the presence of a particular amount of a polybutadiene having a number average molecular weight of 1500–10000, the carboxylic acid groups from the (meth)acrylic groups being at least partly ionized. The invention also pertains to an aqueous dispersion of an acrylic polymer thus stabilized.

10 Claims, No Drawings

PROCESS FOR THE PREPARATION OF A DISPERSION STABILIZER AND A DISPERSION STABILIZER

This is a division of application Ser. No. 07/135,254 U.S. Pat. No. 4, filed Dec. 21, 1987.

The invention relates to an aqueous dispersion of an addition polymer built up from an acrylate monomer and/or a methacrylate monomer, which dispersion also contains a dispersion stabilizer in an amount of 5-100 per cent by weight, based on the addition polymer. A dispersion of the type indicated above is prepared by a dispersion polymerization or an emulsion polymerization in which use is made of a reaction mixture consisting of one or more monomers and a dispersion stabilizer and during which polymerization the addition polymer formed separates from the reaction mixture.

The invention has for its object to provide a new stabilizer for the aqueous dispersion, as a result of which the polymeric micro particles are sterically stabilized and do not exhibit any flocculation, agglomeration or any other destabilization in the dispersion.

According to the invention the dispersion stabilizer is obtained by successive copolymerization in random order of 10-60 parts by weight of a monomer mixture A consisting of 20-60 mole % of styrene and/or methyl styrene, 20-60 mole % of acrylic acid and/or methacrylic acid and 0-40 mole % of a different monoethylenically unsaturated compound, and 10-60 parts by weight of a monomer mixture B consisting of 20-60 mole % of styrene and/or methyl styrene, 40-80 mole % of (cyclo)alkyl methacrylate having 1-12 C-atoms in the (cyclo)alkyl group, and 0-40 mole % of a different monoethylenically unsaturated compound in the presence of 10-60 parts by weight consisting of a polymer built up from at least 60 per cent by weight of 1,3-butadiene and having a number average molecular weight of 1500-10,000, in such a way that the total mount of the two monomer mixtures and the polybutadiene is 100 parts by weight, with the carboxylic acid groups from the acrylic acid and/or methacrylic acid being at least partly ionised.

According to the invention the dispersion stabilizer consists of a 1,3-butadiene (co)polymer onto which both a hydrophilic copolymer (A) and a hydrophobic copolymer (B) have been grafted in separate steps. The dispersions of an addition polymer stabilized with this stabilizer have very great stability relative to both organic solvents and shearing forces.

As suitable acrylate monomers and/or methacrylate monomers from which the addition polymer to be dispersed is built up may be mentioned (cyclo)alkyl (meth)acrylates of which the (cyclo)alkyl group contains 1-24 carbon atoms, such as methyl methacrylate, ethyl acrylate, ethyl methacrylate, propyl methacrylate, butyl acrylate, butyl methacrylate, 2-ethylhexyl acrylate, 2-ethylhexyl methacrylate, octyl acrylate, isobornyl acrylate, dodecyl acrylate, hexadecyl acrylate, oleyl acrylate and cyclohexyl acrylate. Optionally, the above-mentioned monomeric compound(s) may be mixed with one or more other, ethylenically unsaturated monomers such as hydroxy functional or epoxy functional (meth)acrylates; for instance: 2-hydroxyethyl acrylate, 2-hydroxyethyl methacrylate, 2-hydroxypropyl acrylate, 2-hydroxy-propyl methacrylate and glycidyl methacrylate, and/or monomers such as ethoxyethyl methacrylate, vinyl acetate, vinyl propionate, acrylonitrile, methacrylonitrile, styrene and methyl styrene, acrylamide, methacrylamide, the reaction product of isocyanatoethyl methacryyate and an amine such as benzylmine, and the reaction product of isocyanatoethyl methacrylate and an alcohol such as butanol.

Optionally, use may be made of small amounts (up to about 10% by weight, calculated on the monomer composition) of monomers which are poly-functional with respect to the polymerization reaction. As examples of suitable poly-functional monomers may be mentioned: allyl methacrylate, divinyl benzene the reaction product of (meth)acrylic acid and glycidyl (meth)acrylate, trimethylol propane triacrylate, trimethylol propane diacrylate, trimethylol propane trimethacrylate, trimethylol propane dimethacrylate, 1,4-butane diol diacrylate, 1,4-butane diol dimethacrylate, 1,6-hexane diol diacrylate, 1,6-hexane diol dimethacrylate, pentaerythritol triacrylate and pentaerythritol trimethacrylate.

Polymerization of the monomers referred to above is carried out with the aid of a radical initiator, in the presence of 5-100% by weight (calculated on the weight of the monomers) of the stabilizer according to the invention, in water or in a mixture of water and at most 80% by weight of a volatile organic solvent which is miscible with water. On conclusion of the polymerization the organic solvent, if used, may partly or entirely be removed, for instance by distillation. In this way a stable, aqueous dispersion of the (meth)acrylate addition polymer with an average particle size of 100-250 nm is obtained. It is preferred that the organic solvent should be an alcohol having 1-4 carbon atoms, such as methanol, ethanol, isopropyl alcohol and/or butanol.

The polymerization reaction is preferably carried out under an atmosphere of an inert gas such as nitrogen and preferably under reflux using 0.1 to 5% by weight (calculated on the monomer) of a radical initiator such as an organic peroxide, for instance dilauroyl peroxide, dibenzoyl peroxide, an azo compound, for instance: azobisisobutyronitrile or axobiscyanovaleric acid, an inorganic peroxide, for instance, potassium persulphate or a mixture consisting of, for instance, a hydroperoxide, such as tert. butyl hydroperoxide, and a reducing agent such as sodium formaldehyde sulphoxylate or preferably ascorbic acid.

The stabilizer to be used according to the present invention is a stabilizer obtained by polymerization in succession of two specific monomer mixtures in the presence of a polymer which is built up from at least 60 per cent by weight of 1,3-butadiene (which polymer is referred to hereinafter as poly-butadiene). This polymer is preferably built up from at least 80% per cent by weight of 1,3-butadiene and an ethylenically unsaturated monomer such as styrene, acrylonitrile and/or isoprene. The number average molecular weight of the polybutadiene is preferably 2200-6000. The steric configuration of the polybutadiene may vary; for instance it may have a high cis-1,4 content, a high trans-1,4 content or a high 1,2 content, or a combination of 2 or 3 configurations. Optionally, the polybutadiene may have terminal hydroxy groups and/or carboxyl groups.

According to the invention it is preferred that the monomer mixture A to be used in the preparation of the dispersion stabilizer should consist of 35-60, more particularly 45-55 mole % of styrene and/or methyl styrene, 30-55, more particularly 40-55 mole % of acrylic acid and/or methacrylic acid and 0-40 mole % of a different monoethylenically unsaturated compound. It is preferred that the monomer mixture B should consist of 30-60, more particularly 40-55 mole % of styrene and/or methyl styrene, 45-70, more particularly 45-60 mole % of (cyclo)alkyl methacrylate having 1-12 C-atoms in the (cyclo)alkyl group, and 0-40 mole % of a different monoethylenically unsaturated compound. By methyl styrene is to be understood here α- methyl styrene and ortho-, meta- or para-methyl styrene. As examples of suitable monoethylenically unsaturated compounds which may be used besides the styrene and/or methyl styrene and the acrylic acid and/or methacrylic acid in monomer mixture A may be mentioned monovinyl aromatic hydrocarbons such as vinyl toluene and vinyl naphthalene; nitriles, such as acrylonitrile and/or methacrylonitrile; acrylic or methacrylic esters, such as methyl methacrylate, ethyl acrylate, 2-hydroxyethyl acrylate, 2-methoxyethyl methacrylate, 2-ethoxyethyl methacrylate, 2-hydroxyethyl methacrylate, glycidyl methacrylate, 2-hydroxypropyl methacrylate, butyl methacrylate, 4-hydroxybutyl acrylate, 6-hydroxyhexyl acrylate, p-hydroxycyclohexyl acrylate, 2-ethylhexyl acrylate, 8-hydroxyoctyl acrylate, n-dodecyl acrylate and n-hexadecyl acrylate; ethylenically unsaturated monocarboxylic acids such as crotonic acid and itaconic acid; and compounds such as vinyl chloride, vinyl acetate and vinyl propionate, acrylamide or methacrylamide. Mixtures of such compounds may also be used. If preferred, such compounds may also be used in monomer mixture B.

It is preferred that 10-60 parts by weight of monomer mixture A should be copolymerized in the presence of 10-60 parts by weight of the polybutadiene, after which 10-60 parts by weight of monomer mixture B are copolymerised in the presence of the reaction product formed. Alternatively, copolymerization of 10-60 parts by weight of mixture B may be carried out first in the presence of 10-60 parts by weight of the polybutadiene, followed by copolymerization of 10-60 parts by weight of monomer mixture A in the presence of the reaction product formed. If preferred, part of the one monomer mixture may be polymerized followed by part of the other monomer mixture followed again by successively part of the one and part of the other monomer mixture. Optionally, parts of the monomer mixtures may be successively polymerized several times.

Copolymerization of the monomer mixtures for the stabilizer according to the invention is generally carried out with the aid of a radical initiator in an amount of 1 to 12, preferably 2 to 10 per cent by weight, calculated on the polybutadiene, in an organic solvent and at a temperature of 60° to 150° C., preferably 80° to 110° C., under an atmosphere of an inert gas, such as nitrogen. A preferred radical initiator is di-t-butyl peroxide, dibenzoyl peroxide or a substituted dibenzoyl peroxide. Examples of substituted dibenzoyl peroxides include di(2-methylbenzoyl) peroxide and di(2,4-dichlorobenzoyl) peroxide.

A preferred suitable organic solvent is a water-miscible organic solvent, more particularly an ether group-containing alcohol, such as propylene glycol monopropyl ether, propylene glycol monobutyl ether, propylene glycol mono-isopropyl ether, propylene glycol mono-isobutyl ether, diethylene glycol monobutyl ether and dipropylene glycol monomethyl ether. The stabilizer is with advantage prepared in a concentration of 30-50% by weight. Optionally, the resulting solution or dispersion may be diluted with a solvent such as methanol, at elevated temperature, if required, to a solids content of, for instance, 10% by weight. Then usually a bluish dispersion of the stabilizer is obtained which has an average particle size of 100-250 nm (determined by dynamic light scattering). The hydrophobic part of the stabilizer (the polybutadiene plus the copolymerized monomer mixture A) is insoluble in the dispersing agent used, but is stabilized by the hydrophilic part of the stabilizer (the copolymer of styrene and/or methyl styrene, acrylic acid and/or methacrylic acid and optionally a different ethylenically unsaturated monomer) which is solvated by the dispersing agent.

According to the invention 40-100% of the carboxylic acid groups from the acrylic acid and/or methacrylic acid are ionised by adding 0.5-1.5, preferably 0.8-1.3 equivalents of an ionizing agent per equivalent of carboxylic acid group. As examples of suitable ionizing agents for the carboxylic acid may be mentioned ammonia and amines, such as N,N-dimethyl ethanolamine, N,N-diethyl ethanolamine, triethylamine and morpholine. It is preferred that the carboxylic acid groups should be ionized after preparation of the stabilizer.

Optionally, the stabilizer according to the invention, prepared in an ether group-containing alcohol, may after ionization be further diluted with water. In the process of carrying out the polymerization reaction for the preparation of the aqueous dispersion of the addition polymer it is preferred that the monomeric compound(s) should be added slowly to a dispersion of the stabilizer in water, so that no relatively high monomer concentrations will form in the reaction medium. Adding the monomer over a period of ¼ to 4 hours will result in a stable polymer dispersion, without making use of an alcohol as (additional) solvent. With this embodiment it is preferred that the initiator should be a mixture of a peroxide, such as tert. butyl hydroperoxide, and a reducing agent such as ascorbic acid or an azo compound such as azobiscyanovaleric acid.

Optionally, the stabilizer according to the invention may be used in combination with other stabilizers commonly used in emulsion polymerizations such as sodium lauryl sulphate, or the adduct of 1 mole of nonylphenol and 5-12 moles of ethylene oxide, or the ammonium salt of the sulphate of the adduct.

The aqueous dispersions of the addition polymer according to the invention may also contain the usual additives and adjuvants, such as pigments, dispersing agents, dyes, solvents and accelerators for the curing reaction. The pigments may be of an acid, neutral or basic nature and they may be organic or inorganic. Optionally, the pigments may have been pretreated for modifying their properties. As examples of suitable pigments may be mentioned: titanium dioxide, iron oxide, carbon black and phthalocyanin pigments. Also metal pigments based on, for instance, aluminium and stainless steel may be used.

Curing the coats obtained by using the dispersions according to the present invention may be carried out by physical drying. Alternatively, however, the coats may be cured if the addition polymer and/or the stabilizer in the dispersed particles contain hydroxyl groups and the aqueous dispersion contains a curing agent reacting with hydroxyl groups. As examples of suitable curing agents may be mentioned N-methylol groups- and/or N-methylol ether groups-containing amino resins obtained by reacting an aldehyde, such as formaldehyde, with an amino or amide groups-containing compound such as melamine, urea, N,N'-ethylene urea, dicyanodiamide and benzoguanamine. The resulting compounds are preferably entirely or partly etherified with alcohols having 1 to 6 carbon atoms, such as methanol, ethanol, n-propanol, isopropanol, n-butanol, isobutanol, amyl alcohol, hexanol or mixtures thereof. Particularly favorable results may be obtained by using a methylol melamine having 4-6 methylol groups per molecule of melamine, at least 3 methylol groups being etherified with butanol, or a butanol etherified condensation product of formaldehyde and N,N'-ethylene diurea. Other suitable curing agents are, for instance, water-dispersible, blocked poly-isocyanates. The above-envisaged curing agents are generally applied in an amount such that the molar ratio of the hydroxyl groups of the dispersion to the reactive groups of the curing agent is in the range of 0.7 to 1.5, preferably 0.9 to 1.1.

The dispersions according to the invention may be applied to a substrate in any desirable manner, such as by roller coating, spraying, brushing, sprinkling, flow coating, dipping, electrostatic spraying or electrophoresis. As suitable substrates may be mentioned wood, metal and synthetic material.

Curing may be carried out at ambient temperature after evaporation of the solvent or at higher temperatures in the range of, for instance, 60° to 160° C., in a baking oven and over a period of 10 to 60 minutes.

The acrylate dispersions according to the invention form a rapidly drying glossy coat on wood, metal and synthetic material. They are extremely suitable for use on wood as a clear lacquer and give a transparent coat which imparts a high glow and gloss to the wood. Applied to wood, the coat is tack-free and dust-dry after 15–30 minutes at room temperature. After about 1 week's drying at room temperature its resistance to water and alcohol is very good. The appearance of the coat on wood is comparable with that obtained with a conventional nitrocellulose lacquer, which is often used in the furniture industry, and which contains about 80% by weight of organic solvent, which creates atmospheric pollution and a fire hazard. Use there of the water-dilutable dispersions according to the invention is therefore of great advantage.

The acrylate dispersions according to the invention are also extremely suitable for applying coating compositions containing a so-called non-leafing aluminium paste or some other metallic pigment in order to obtain a coat having a metallic appearance. These metal pigments are especially used in the automobile industry in order to obtain so-called high gloss metallics. Then the difficulty is to obtain both an attractive metallic appearance and a high gloss. For a proper metallic effect the aluminium pigment should be well fixed during spraying of the coating composition. In order that a high gloss may be obtained the aluminium pigment-containing coat is sprayed with a clear (unpigmented) coat. This dual coat system is referred to as base-coat/clear-coat system. The composition of the clear-coat is generally based on an organic solvent.

To prevent the aluminium pigment-containing base-coat from being unduly softened by the clear-coat, which is attended with loss of the metallic effect, use is generally made in a conventional base-coat system of cellulose acetobutyrate. This additive, however, has the great disadvantage that in order to make it possible for the composition to be sprayed it should be diluted with a large proportion of organic solvent. Conventional base-coat systems generally contain 80-90 % of organic solvent. Use of the water-dilutable dispersions according to the invention as base-coat composition also offers the advantage of a strong reduction of atmospheric pollution.

Particularly suitable for this use are water-dilutable dispersions according to the invention which are so prepared that in the monomer composition there is used a small proportion of the above-mentioned polyunsaturated monomers, as a result of which the polymer micro particles are entirely or partly cross-linked. Also particularly suitable for this use are the water-dilutable dispersions according to the invention which are so prepared that in the monomer composition there is used a small proportion of the above-mentioned monomers such as acrylonitrile, methacrylonitrile, acrylmide, methacrylamide, acrylurea, methacrylurea, acrylates and/or methacrylates and urea group(s) such as the reaction product of isocyanatoethyl methacrylate and an amine such as benzylamine, acrylates and/or methacrylates having one or more urethane group(s), such as the reaction product of isocyanatoethyl methacrylate and an alcohol such as butanol, as a result of which the polymer micro particles are made wholly or partially insoluble in the usual organic coating solvents. This results in a highly improved resistance of the coat to organic solvents. In this way the base-coat is prevented from being unduly softened by the clear-coat, so that loss of the metallic effect can be avoided.

The water-dilutable dispersions according to the invention can be used as such in a metallic base-coat, or in combination with water-soluble polymers.

In combination with a base-coat based on the dispersion according to the invention the clear-coat may for instance be a clear baking lacquer of a conventional acrylate/melamine composition. This system is cured in a baking oven for 20–30 minutes at a temperature of 130°–150° C. A so-called two-component system based on an acrylate/polyisocyanate composition which is cured in a baking oven for 20–30 minutes at a temperature of 60°–80° C. may also be applied as a clear-coat. Even after curing at low temperature the total base-coat/clear-coat system displays excellent resistance to water, which is often a great problem in the case of water-dilutable systems.

The invention will be further described in the following examples, which must not be construed as limiting the scope of the present invention. The mean particle size was determined by dynamic light scattering, the dispersion being diluted with methanol or water to a solids content of about 0.1% by weight. The hydroxyl number is expressed in mg KOH/g. The viscosity was determined with a Brookfield viscometer. The polymer dispersions obtained according to the Examples all had a bluish appearance.

Preparation of Stabilizer A

Step I

In a 3-litre flask fitted with a stirrer, a thermometer, a reflux condenser and a dropping funnel there were homogeneously mixed:
  285.0 g of polybutadiene having a number average molecular weight of 2800, and a hydroxyl number of 46.6 and composed of 20% of vinyl-1,2, 60% of trans-1,4 and 20% of cis-1,4 polybutadiene
  860.9 g of n-propoxypropanol-2.

The dropping funnel was filled with a homogeneous mixture of:

156.0 g of styrene
129.0 g of methacrylic acid
22.8 g of dibenzoyl peroxide (50% by weight in dicyclohexyl phthalate)

After deaeration the flask and the dropping funnel were brought under a nitrogen atmosphere. The contents of the flask were heated to 90° C., after which the contents of the dropping funnel were added to the flask for one hour, with the contents of the flask being kept at 90° C. After the dropping funnel had been emptied the contents of the flask were kept at 90° C. for another 5 hours.

Step II

To the reaction product in the flask of Step I were added 216.6 g of n-propoxylpropanol-2.
The dropping funnel was filled with a homogeneous mixture of:
71.3 g of styrene
71.3 g of methyl methacrylate
11.4 g of dibenzoyl peroxide (50% by weight in dicyclohexyl phthalate).

After deaeration the flask and the dropping funnel were brought under a nitrogen atmosphere. The contents of the dropping funnel were introduced into the flask over a period of 30 minutes with the temperature of the flask's contents being kept at 90° C. After the dropping funnel had been emptied, the contents of the flask were kept at 90° C. for a further period of 5 hours. A dispersion of Stabilizer A in n-propoxypropanol-2 with a solids content of 40% by weight was obtained.

Preparation of Stabilizer B

Step I of the preparation of Stabilizer A was repeated.

Step II

To the reaction product in the flask of Step I were added:
433.2 g of n-propoxypropanol-2.
The dropping funnel was filled with a homogeneous mixture of:
142.5 g of styrene
142.5 g of methyl methacrylate
22.8 g of dibenzoyl peroxide (50% by weight in dicyclohexyl phthalate).

The contents of the dropping funnel were added to the flask over a period of 1 hour at 90° C. with the temperature of the contents of the flask being kept at 90° C. After the dropping funnel had been emptied, the contents of the flask were kept at 90° C. for a further period of 5 hours. A dispersion of Stabilizer B in n-propoxypropanol-2 with a solids content of 40% by weight was obtained.

Preparation of Stabilizer C

Step I of the preparation of Stabilizer A was repeated.

Step II

To the reaction product in the flask of Step I were added:
433.2 g of n-propoxypropanol-2.
The dropping funnel was filled with a homogeneous mixture of:
164.5 g of butyl methacrylate
120.5 g of styrene
22.8 g of dibenzoyl peroxide (50% by weight in dicyclohexyl phthalate).

The contents of the dropping funnel were added to the flask over a period of 1 hour at 90° C., with the temperature of the flask's contents being kept at 90° C. After the dropping funnel had been emptied, the contents of the flask were kept at 90° C. for a further period of 5 hours. A dispersion of Stabilizer C was obtained in n-propoxypropanol with a solids content of 40% by weight.

Preparation of Stabilizer D

Step I of the preparation of Stabilizer A was repeated.

Step II

To the reaction product in the flask of Step I were added:
216.6 g of n-propoxypropanol-2.
The dropping funnel was filled with a homogeneous mixture of:
82.3 g of butyl methacrylate
60.3 g of styrene
11.4 g of dibenzoyl peroxide (50% by weight in dicyclohexyl phthalate).

The contents of the dropping funnel were added to the flask over a period of 30 minutes at 90° C., with the temperature of the flask's contents being kept at 90° C. After the dropping funnel had been emptied, the contents of the flask were kept at 90° C. for a further period of 5 hours. A dispersion of Stabilizer D was obtained in n-propoxypropanol-2 with a solids content of 40% by weight.

Preparation of Stabilizer E

The preparation of Stabilizer B was repeated, except that use was made of 836.5 g of n-propoxypropanol-2 instead of 860.7 g and of 34.2 g of dibenzoyl peroxide (50% by weight in dicyclohexyl phthalate) instead of 22.8 g as used in Step I.

A dispersion of Stabilizer E was obtained in n-propoxypropanol-2 with a solids content of 40% by weight.

EXAMPLE 1

To 468.75 g of Stabilizer A (40% by weight in n-propoxypropanol-2) in a 6-litre flask fitted with a stirrer, a thermometer, a reflux condenser and a dropping funnel the following components were successively added dropwise with stirring and at a temperature of approximately 50° C.:
1517.5 g of methanol
a mixture of
27.5 g of N,N-dimethyl ethanolamine and
27.5 g of demineralized water
1191.3 g of demineralized water.

The resulting dispersion had a bluish appearance. It was cooled to ambient temperature, after which there were added:
562.5 g of a monomer mixture consisting of:
0.62 moles of butyl methacrylate
0.32 moles of butyl acrylate
0.06 moles of 2-hydroxypropyl methacrylate and
7% by weight of trimethyl propane triacrylate 14.1 g of azobisisobutyronitrile.

After deaeration the flask was brought under a nitrogen atmosphere and heated to reflux temperature (75° C.). The reaction mixture was then kept at reflux temperature for 6 hours.

On conclusion of the reaction the polymer dispersion obtained was diluted with 1517.5 g of demineralized water and the methanol was removed by distillation.

The resulting polymer dispersion had the following properties:

| solids content | 23.8% by weight |
|---|---|
| viscosity | 0.7 Pa · s |
| average particle size: | 140 nm (in methanol) |
| | 185 nm (in water) |
| pH | 8.5 |

EXAMPLE 2

To 562.5 g of Stabilizer B (40% by weight in n-propoxypropanol-2) in a 6-litre flask fitted with a stirrer, a thermometer, a reflux condenser and a dropping funnel the following components were successively added dropwise with stirring and at a temperature of approximately 50° C.:

1460 g of methanol
a mixture of
27.4 g of N,N-dimethyl ethanolamine and
27.4 g of demineralized water
1190.1 g of demineralized water.

The resulting dispersion had a bluish appearance. It was cooled to ambient temperature, after which there were added:

525 g of the monomer mixture of EXAMPLE 1
13.1 g of azobisisobutyronitrile.

After deaeration the flask was brought under a nitrogen atmosphere and heated to reflux temperature (75° C.). The reaction mixture was then kept at reflux temperature for 6 hours. On conclusion of the reaction the polymer dispersion obtained was diluted with 1460 g of demineralized water and the methanol was distilled off.

The polymer dispersion obtained had the following properties:

| Solids content | 25.5% by weight |
|---|---|
| viscosity | 0.53 Pa · s |
| average particle size | 140 nm (in methanol) |
| | 165 nm (in water) |
| pH | 8.5 |

EXAMPLE 3

Example 2 was repeated, with the exception that 525 g were used of a monomer mixture consisting of:

0.6 moles of butyl acrylate
0.35 moles of methyl methacrylate
0.05 moles of 2-hydroxypropyl methacrylate
instead of 525 g of the monomer mixture used in Example 2.

The resulting polymer dispersion had the following properties:

| solids content | 21.9% by weight |
|---|---|
| viscosity | 0.46 Pa · s |
| average particle size | 150 nm (in methanol) |
| pH | 8.5 |

EXAMPLE 4

To 225 g of Stabilizer B (40% by weight in n-propoxy propanol-2) in a 2-litre flask fitted with a stirrer, a thermometer, a reflux condenser and two dropping funnels the following components were successively added dropwise, with stirring and at a temperature of approximately 50° C.:

a mixture of:
11.0 g of N,N-dimethyl ethanolamine and
11.0 g of demineralized water,
949.6 g of demineralized water.

The resulting dispersion had a bluish appearance. It was cooled to ambient temperature, after which there was added a mixture of:

100 g of demineralized water and
0.8 g of L(+) ascorbic acid.

One dropping funnel was filled with 210 g of the monomer mixture according to Example 3; the other dropping funnel was filled with a mixture of 168 g of demineralized water and 1.435 g of t-butyl hydroperoxide (70% by weight in water).

After deaeration the flask and dropping funnels were brought under a nitrogen atmosphere, after which the contents of the flask were heated to 55° C. The contents of the two dropping funnels were added to the flask dropwise over a period of 2 hours, with the reaction temperature being kept at 55° C. After the dropping funnels had been emptied the reaction mixture was kept at a temperature of 55° C. for another 2 hours.

The resulting polymer dispersion had the following properties:

| solids content | 18% by weight |
|---|---|
| viscosity | 0.092 Pa · s |
| pH | 8.2 |

EXAMPLE 5

To a mixture of 150 g of Stabilizer B (40% by weight in n-propoxypropanol-2) and 1 g of a 30% by weight aqueous solution of nonyl phenol ammonium sulphate +9 moles of ethylene oxide (available from GAF under the trademark Fenopon EP-110) in a 2-litre flask fitted with a stirrer, a thermometer, a reflux condenser and two dropping funnels, the following components were successively added dropwise, with stirring and at a temperature of approximately 50° C.: a mixture of:

7.3 g of N,N-dimethyl ethanolamine and
7.3 g of demineralized water and
680 g of demineralized water.

The resulting dispersion had a bluish appearance. It was cooled to ambient temperature, after which a mixture was added of:

100 g of demineralized water and
0.54 g of L(+) ascorbic acid.

One dropping funnel was filled with a mixture of:
140 g of the monomer mixture according to Example 3 and 1.67 g of Fenopon EP-110 ® (30% in water). The other dropping funnel was filled with a mixture of:
100 g of demineralized water and 0.96 g of t-butyl hydroperoxide (70% in water).

After deaeration the flask and the dropping funnels were brought under a nitrogen atmosphere, after which the contents of the flask were heated to 55° C. The contents of the two dropping funnels were introduced into the flask dropwise over a period of 2 hours, with the reaction temperature being kept at 55° C.

After the dropping funnels had been emptied, the reaction mixture was kept at a temperature of 55° C. for another 2 hours.

The resulting polymer dispersion had the following properties:

| solids content | 17% by weight |
|---|---|
| viscosity | 0.14 Pa · s |
| pH | 8.3 |

EXAMPLE 6

To 150 g of Stabilizer B (40% by weight in n-propoxypropanol-2) in a 2-litre flask fitted with a stirrer, a thermometer, a reflux condenser and a dropping funnel the following components were successively added dropwise, with stirring and at a temperature of about 50° C.: a mixture of:
  7.3 g of N,N-dimethyl ethanolamine and
  7.3 g of demineralized water,
  738 g of demineralized water.

The resulting dispersion had a bluish appearance. It was cooled to ambient temperature, followed by adding a mixture of:
  140 g of demineralized water
  1.4 g of azobiscyanovaleric acid (75% in water)
  0.7 g N,N-dimethyl ethanolamine.

The dropping funnel was filled with a mixture of
  140 g of the monomer mixture according to EXAMPLE 3 and 2.67 g of Fenopon EP-110 (30% in water).

After deaeration the flask and the dropping funnel were brought under a nitrogen atmosphere, after which the flask's contents were heated to 80° C. The contents of the dropping funnel were added to the flask dropwise over a period of 1 hour with the reaction temperature being kept at 80° C. After the dropping funnel had been emptied, the reaction mixture was kept at 80° C. for another 2 hours.

The resulting polymer dispersion had the following properties:

| solids content | 17% by weight |
|---|---|
| viscosity | 0.09 Pa · s |
| pH | 8.3 |

EXAMPLE 7

To 150 g of Stabilizer E (40% by weight in n-propoxypropanol-2) in a 2-litre flask fitted with a stirrer, a thermometer, a reflux condenser and two dropping funnels the following components were successively added dropwise, with stirring and at a temperature of about 50° C.: a mixture of:
  7.2 g of N,N-dimethyl ethanolamine and
  7.2 g of demineralized water
  552.8 g of demineralized water.

The resulting dispersion was bluish in appearance. It was cooled to ambient temperature, followed by adding a mixture of:
  100 g of demineralized water and
  0.5 g of L(+) ascorbic acid.

One dropping funnel was filled with 140 g of the monomer mixture according to EXAMPLE 1 and the other dropping funnel was filled with a mixture of 100 g of demineralized water and 0.9 g of t-butyl hydroperoxide (70% by weight in water).

After deaeration the flask and the dropping funnels were brought under a nitrogen atmosphere after which the contents of the flask were heated to 55° C. The contents of the two dropping funnels were introduced into the flask dropwise over a period of 2 hours with the reaction temperature being kept at 55° C. After the dropping funnels had been emptied, the reaction mixture was kept at a temperature of 55° C. for another 2 hours.

The resulting polymer dispersion had the following properties:

| solids content | 19% by weight |
|---|---|
| viscosity | 92 mPa · s |
| average particle size | 178 nm (in water) |
| pH | 8.2 |

EXAMPLE 8

Example 7 was repeated, except that one dropping funnel was filled with a homogeneous mixture of:
  92.6 g of butyl acrylate
  8.7 g of 2-hydroxypropyl methacrylate and
  30.1 g of methyl methacrylate and the other dropping funnel was filled with a homogeneous mixture of:
  100 g of demineralized water
  8.6 g of acrylamide and
  0.9 g of t-butyl-hydroperoxide.

The resulting polymer dispersion had the following properties:

| solids content | 19% by weight |
|---|---|
| viscosity | 135 mPa · s |
| pH | 8.47 |

EXAMPLE 9

Example 2 was repeated except that 562.5 g of Stabilizer E were used instead of 562.5 g of Stabilizer B and that 525 g of a monomer mixture consisting of:
  0.6 moles of butyl acrylate
  0.05 moles of 2-hydroxypropyl methacrylate
  0.25 moles of methyl methacrylate
  0.10 moles of acryl amide
were used instead of 525 g of the monomer mixture used in Example 2.

The resulting polymer dispersion had the following properties:

| solids content | 22.4% by weight |
|---|---|
| viscosity | 0.33 Pa · s |
| average particle size | 175 nm (in water) |
| pH | 8.44 |

EXAMPLE 10

Example 9 was repeated except that use was made of a monomer mixture consisting of:
  0.6 moles of butyl acrylate
  0.05 moles of 2-hydroxypropyl methacrylate
  0.25 moles of methyl methacrylate
  0.10 moles of acrylonitrile
instead of the monomer mixture used in Example 9.

The resulting polymer dispersion had the following properties:

| solids content | 24.1% by weight |
|---|---|
| viscosity | 0.39 Pa · s |
| average particle size | 178 nm (in water) |

EXAMPLE 11

Example 9 was repeated, except that use was made of 525 g of a monomer mixture consisting of:
0.6 moles of butyl acrylate
0.05 moles of 2-hydroxypropyl methacrylate
0.33 moles of methyl methacrylate
0.02 moles of the adduct of
  1 mole of isocyanatoethyl methacrylate and
  1 mole of n-hexylamine
instead of the monomer mixture used in Example 9.

The resulting polymer dispersion had the following properties:

| | |
|---|---|
| solids content | 24.2% by weight |
| viscosity | 0.25 Pa·s |
| average particle size | 180 nm (in water) |
| pH | 8.44 |

I claim:

1. A process for the preparation of a dispersion stabilizer, comprising successive copolymerization in random order of 10–60 parts by weight of a monomer mixture A consisting of:
   20–60 mole % of at least one member selected from the group consisting of styrene and methyl styrene;
   20–60 mole % of at least one member selected from the group consisting of acrylic acid and methacrylic acid; and
   0–40 mole % of a different monoethylenically unsaturated compound; and
   10–60 parts by weight of a monomer mixture B consisting of:
   20–60 mole % of at least one member selected from the group consisting of styrene and methyl styrene;
   40–80 mole % of (cyclo)alkyl methacrylate having 1–12 C atoms in the (cyclo)alkyl groups; and
   0–40 mole % of a different monoethylenically unsaturated compound;
in the presence of 10–60 parts by weight of a polymer built up from at least 60% by weight of 1,3-butadiene and having a number average molecular weight of 1500–10,000 in an organic solvent at a temperature of 60°–150° C., use being made of a radical initiator in an amount of 1–12% by weight, calculated on the polybutadiene, and with at least partial ionization of the carboxylic acid groups.

2. A process according to claim 1, wherein said organic solvent is a water-miscible organic solvent.

3. A process according to claim 2, wherein said organic solvent is an ether group-containing alcohol.

4. A process according to claim 1, wherein said radical initiator is at least one member selected from the group consisting of dibenzoyl peroxide, a substituted dibenzoyl peroxide, and di-t-butylperoxide.

5. A process according to claim 1, wherein the radical initiator is used in an amount of 2 to 50 percent by weight, calculated on the polybutadiene.

6. A dispersion stabilizer, prepared by a process, comprising copolymerization in random order of 10–60 parts by weight of a monomer mixture A consisting of:
   20–60 mole % of at least one of styrene and methyl styrene,
   20–60 mole % of acrylic acid and/or methacrylic acid, and
   0–40 mole % of a different monoethylenically unsaturated compound; and
   10–60 parts by weight of a monomer mixture B consisting of:
   20–60 mole % of at least one of styrene and methyl styrene,
   40–80 mole % of (cyclo)alkyl methacrylate having 1–12 C-atoms in the (cyclo)alkyl group, and
   0–40 mole % of a different monoethylenically unsaturated compound;
   in the presence of 10–60 parts by weight of a polymer built up from at least 60 percent by weight of 1,3-butadiene and having a number average molecular weight of 1,500–10,000 in an organic solvent at a temperature of 60°–150° C., use being made of a radical initiator in an amount of 1–12% by weight, calculated on the butadiene polymer, and with at least partial ionization of the carboxylic acid groups.

7. The dispersion stabilizer of claim 6, wherein said organic solvent is a water-miscible organic solvent.

8. The dispersion stabilizer of claim 6, wherein said organic solvent is an ether group-containing alcohol.

9. The dispersion stabilizer of claim 6, wherein said radical initiator is selected from the group consisting of dibenzoyl peroxide, a substituted dibenzoyl peroxide, and di-t-butylperoxide.

10. The dispersion stabilizer of claim 6, wherein said radical initiator is used in amount of 2–10 percent by weight, calculated on the butadiene polymer.

* * * * *

UNITED STATES PATENT AND TRADEMARK OFFICE
CERTIFICATE OF CORRECTION

PATENT NO. : 5,093,411

DATED : March 3, 1992

INVENTOR(S) : Roelof BUTER

It is certified that error appears in the above-identified patent and that said Letters Patent is hereby corrected as shown below:

Col. 2, line 1, change "methyl" to --α-methyl--;

line 38, after "instance" insert --:--;

line 40, change "axobiscyanovaleric" to --azobiscyanovaleric--.

Col. 9, between lines 52 and 53, insert --7% by weight of trimethyl propane triacrylate--.

Signed and Sealed this

First Day of June, 1993

Attest:

MICHAEL K. KIRK

Attesting Officer      Acting Commissioner of Patents and Trademarks